No. 823,728. PATENTED JUNE 19, 1906.
J. W. HUGHES.
SCALE.
APPLICATION FILED JUNE 30, 1905.
2 SHEETS—SHEET 1.
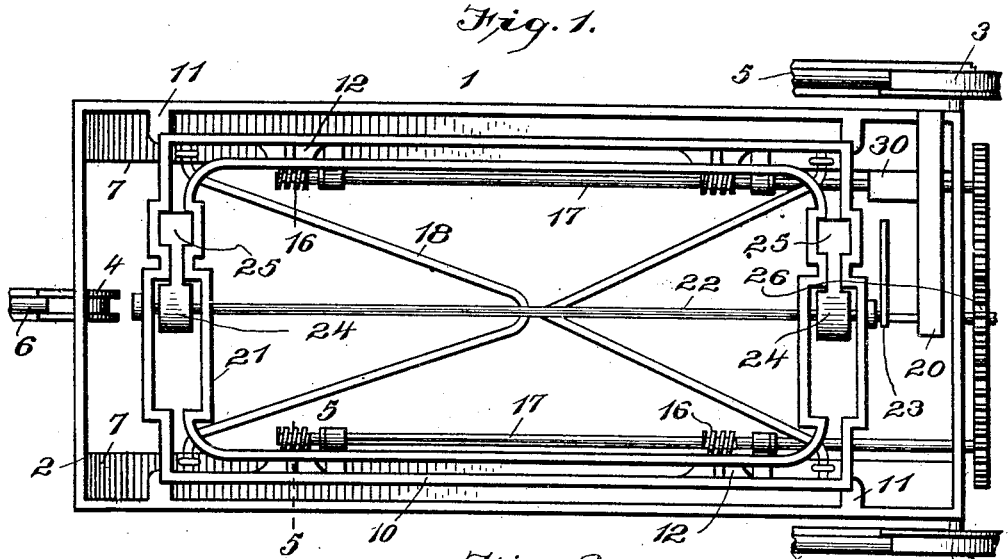
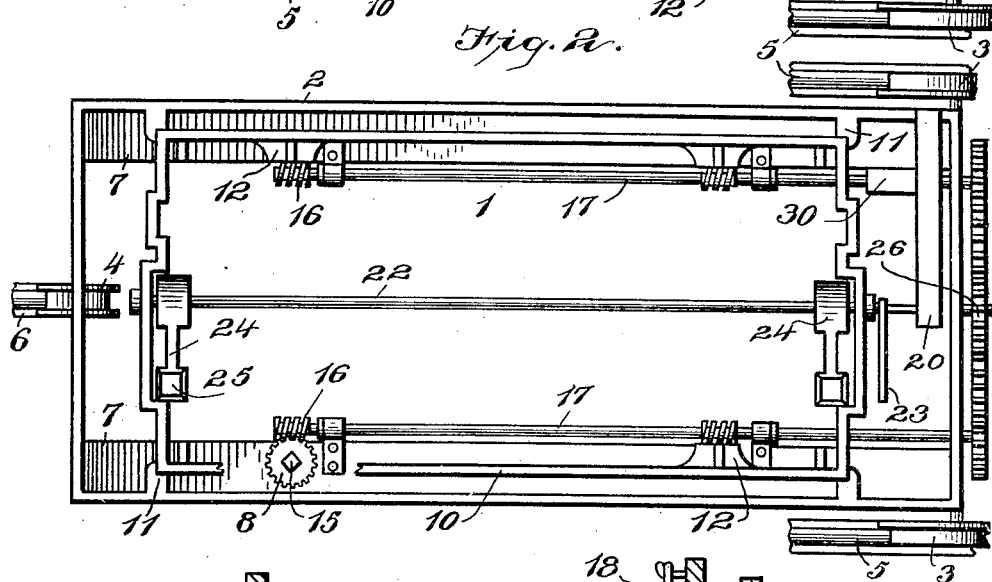
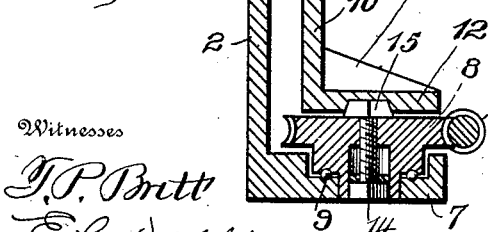
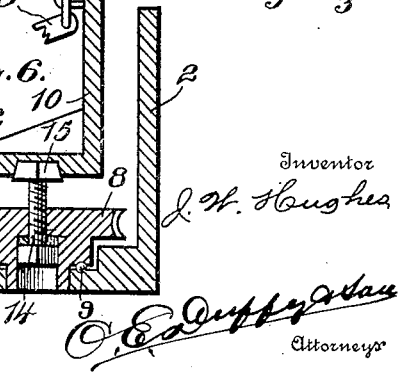
Witnesses
T. P. Britt
E. C. Duffy
Inventor
J. W. Hughes
By
Ed Duffy & Son
Attorneys

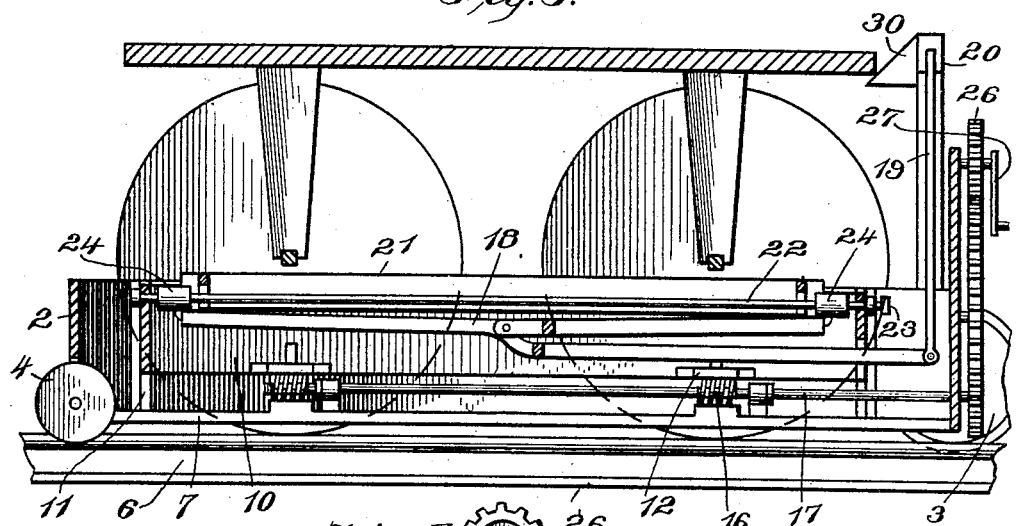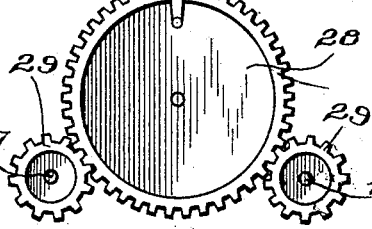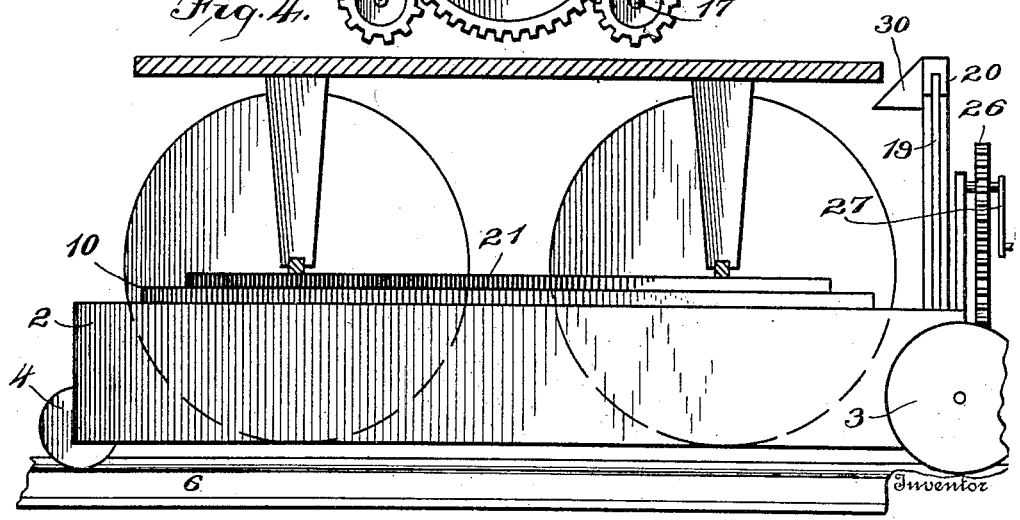

UNITED STATES PATENT OFFICE.

JOHN W. HUGHES, OF QUINCY, ILLINOIS.

SCALE.

No. 823,728.  Specification of Letters Patent.  Patented June 19, 1906.

Application filed June 30, 1905. Serial No. 267,838.

*To all whom it may concern:*

Be it known that I, JOHN W. HUGHES, a citizen of the United States, residing at Quincy, in the county of Adams and State of Illinois, have invented certain new and useful Improvements in Scales; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a device for weighing trucks or vehicles, and has for its object to provide a device so arranged that it is pushed under the truck in order to weigh the same.

With this object in view my invention consists in the novel construction of the scales and scale-truck and also in certain other novel features of construction, which will be first fully described and afterward specifically pointed out in the appended claims.

Referring to the accompanying drawings, Figure 1 is a plan view of the device. Fig. 2 is a similar view showing scales removed. Fig. 3 is a vertical longitudinal section through the device, showing truck in position, Fig. 4 is an elevation showing truck raised on scales. Fig. 5 is a vertical transverse section taken on line 5 5 of Fig. 1, showing frame of scales in lowered position. Fig. 6 is a similar view showing frame in raised position, and Fig. 7 is an elevation showing gearing for raising scales.

Like numerals of reference indicate the same parts throughout the several figures, in which—

1 indicates the device, which comprises the scale-truck 2, which is provided with two wheels 3 at one end thereof and a central wheel 4 at its other end, said wheels 3 and 4 running on tracks 5 and 6, as shown in Figs. 3 and 4.

7 indicates a narrow platform extending along each side of the scale-truck 2, and, as shown in Figs. 5 and 6, a worm gear-wheel 8 is arranged on said platform to rotate on balls 9.

10 indicates the frame of the scales, which is arranged as shown in Figs. 1 and 2, guides 11 being located on the scale-truck 2 to prevent any lateral movement of the scale-frame 10. Formed on said scale-frame 10 are four extensions 12, projecting inwardly at right angles to the side of the said scale-frame 10, a web 13 being arranged, as shown in Figs. 5 and 6, to strengthen the said extensions 12.

14 indicates a screw which is preferably provided with a square head 15, which enters the extensions 12 and which is threaded into a worm gear-wheel 8, and 16 indicates a worm-gear carried on the shaft 17, as shown in Figs. 1 and 2, it of course being understood that this construction is duplicated on both sides of the device. The scale-arms 18 are hung at the inside corners of the scale-frame 10, as shown in Figs. 1, 5, and 6, and a link 19 passes up to the scale-beam 20, as shown in Fig. 3.

21 indicates a frame which rests on the scale-arms 18, as shown in Fig. 1, and 22 indicates a rocking rod which is journaled in the frame 10, as shown in Figs. 1, 2, and 3, said rod being provided with a lever 23, by which the said rod is rocked. Secured on the said rod 22 are locking devices 24, which comprise a tapered and preferably square head 25, the portion between the said head 25 and that portion which is secured to the rod 22 being reduced, as shown in Figs. 1 and 2. Referring particularly to the scale-frame 10 and the inner frame 21, it will be seen from Fig. 1 that the said frames are so formed as to conform to the said locking devices 24 when the said locking device is in position, as shown in Fig. 1, the purpose of this construction being to prevent any lateral movement of the inner frame 21 when moving the machine.

Located at one end of the machine is a gear-wheel 26, provided with a crank 27, said gear-wheel 26 meshing with a large gear-wheel 28, said gear-wheel in return meshing with two smaller gear-wheels 29, said gear-wheels 29 being secured on the worm-gear shafts 17, as shown in Fig. 1.

30 indicates a wedge, Figs. 3 and 4, which is arranged at one end of the machine sufficiently high to be engaged by the truck to be weighed, so as to insure a proper position of the truck on the scales. When the scales are raised, however, and lifted up, the said track is lifted away from the said wedge 30, as shown in Fig. 4, thus preventing any binding between the truck and the wedge.

Having thus fully described the several parts of my invention, its operation is as fol- lows: When it is desired to weigh a truck or vehicle, the machine is run under the truck or the truck may be run over the machine, as is most convenient, the lever 23 on central locking-rod 22 being turned in the position shown in Fig. 1, which throws the locking device 24 into engagement with the scale-frame 10 and the inner frame 21, thereby securely locking said frames against any relatively lateral movement. When the device is in position, the lever 23 is turned down into position shown in Fig. 2, which throws the locking device out of engagement with the scale-frame 10 and the inner frame 21, and the crank 27 on the smaller gear-wheel 26 is revolved, which through the medium of the gear-wheel 28 rotates the smaller gear-wheels 29 and the worm-gears 16. Said worm-gears, meshing with the worm gear-wheels 8, revolve said worm gear-wheels, which lifts the screw 14, as shown in Fig. 6, thereby raising the scale-frame 10 and the inner frame 21. The worm-gears 16 are continued to be rotated until the inner frame 21 engages the truck and lifts the same clear of the ground, as shown in Fig. 4. The material can then be loaded or unloaded from the truck in order to weigh the same, as of course is obvious.

Having thus fully described my invention, I do not wish to be understood as limiting myself to the exact construction as herein set forth, as various slight changes may be made therein which would fall within the limit and scope of my invention, and I consider myself clearly entitled to all such changes and modifications.

What I claim as my invention, and desire to secure by Letters Patent of the United States, is—

1. In a weighing device, the combination of a scale-truck, a frame associated therewith, means for raising said frame, scale-levers carried by said frame, a scale-frame supported by said scale-levers, a locking means arranged to engage said frame and scale-frame for locking said scale-frame against lateral movement, substantially as described.

2. In a weighing device, the combination of a scale-truck, scale-levers associated therewith, means carried on said scale-truck for raising said scale-levers, a scale-frame supported by said scale-levers, and means engaging the outside of said scale-frame for locking said scale-frame against lateral movement, substantially as described.

3. In a weighing device, the combination of a scale-truck, a frame associated therewith, means carried on said scale-truck for raising said frame, scale-levers carried by said frame and a scale-frame supported on said scale-levers, substantially as described.

In testimony whereof I affix my signature in presence of two witnesses.

JOHN W. HUGHES.

Witnesses:
 JOHN P. McMILLEN,
 LLOYD A. VANDEN BOOM.